N. B. RUNNALS.
MULTIPLE SPEED GEARING.
APPLICATION FILED SEPT. 17, 1908.
912,418.
Patented Feb. 16, 1909.
2 SHEETS—SHEET 2.
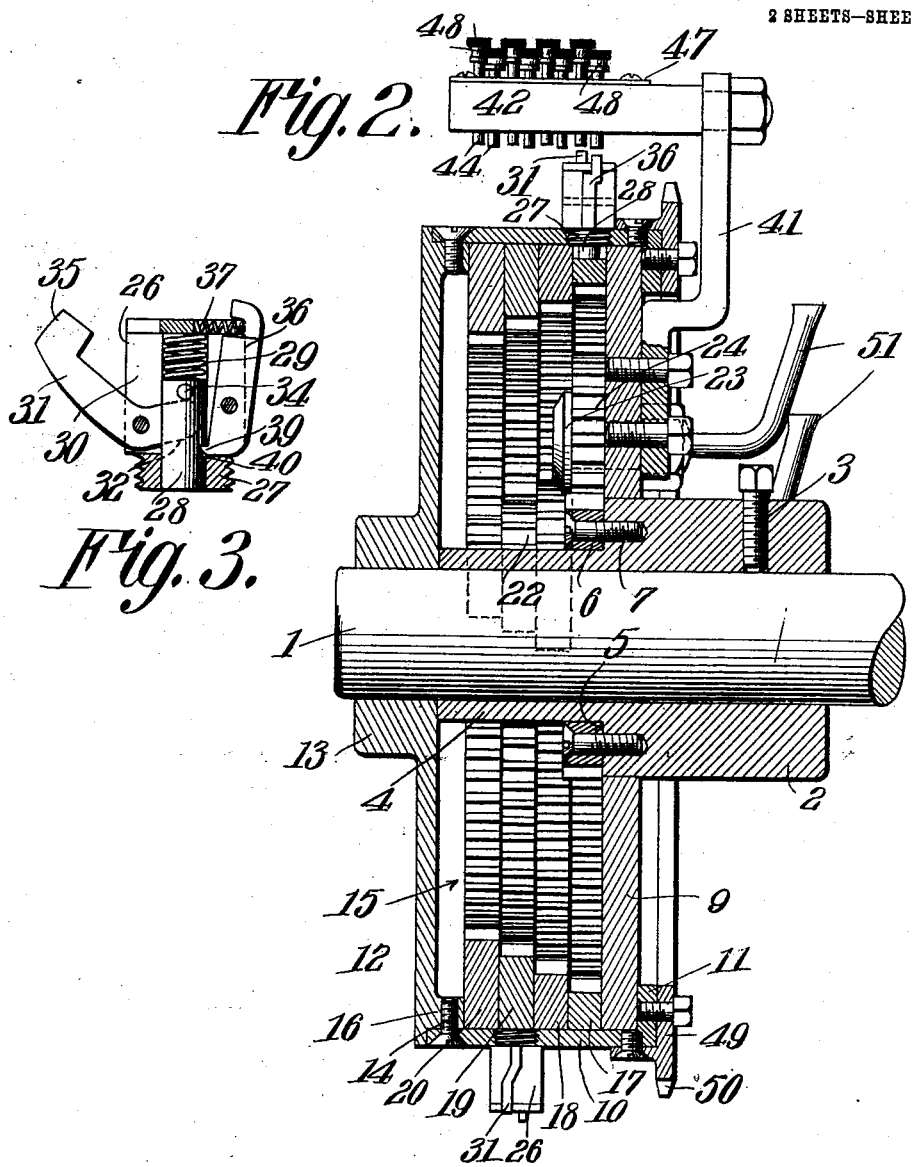
Nathaniel B. Runnals,
Inventor.
Witnesses,
By C. A. Snow & Co.,
Attorneys.

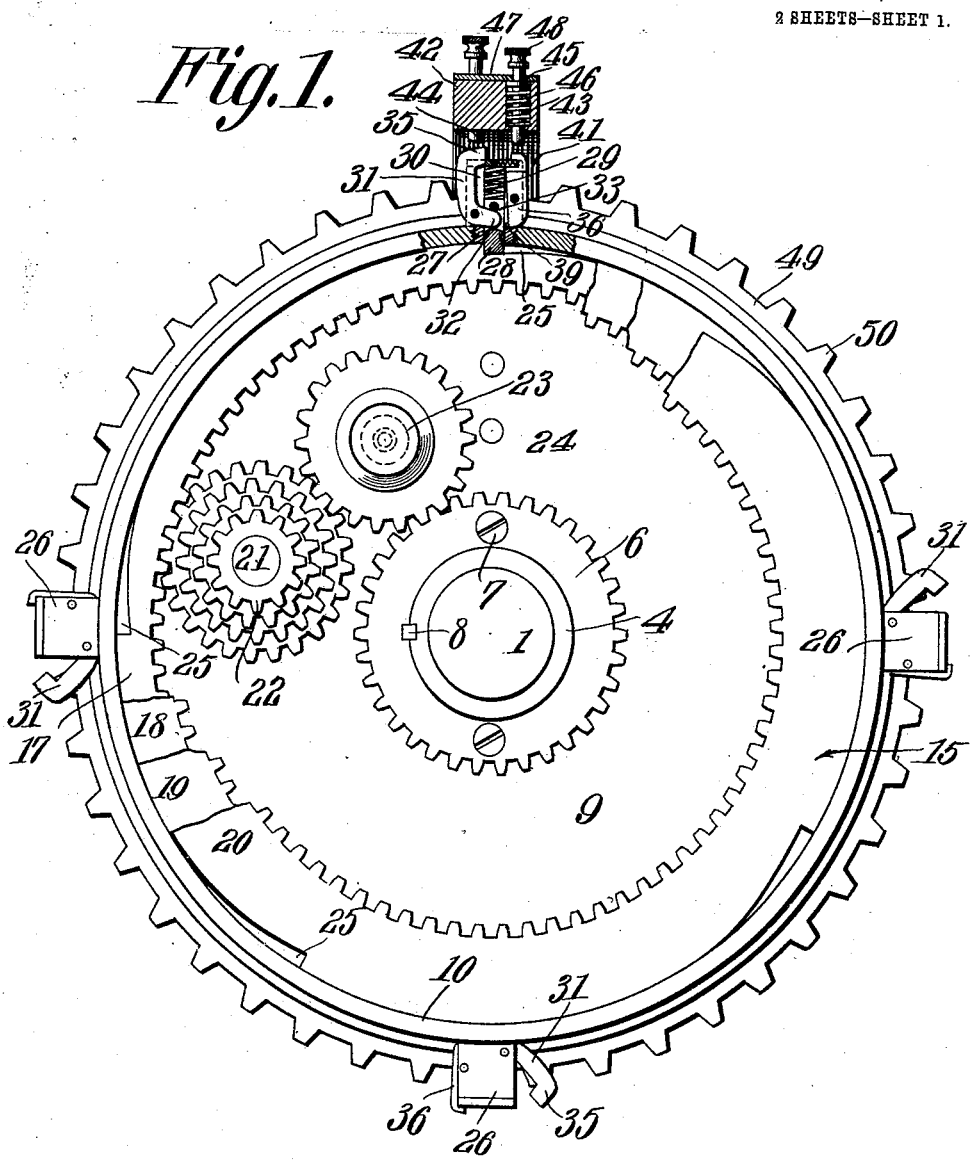

UNITED STATES PATENT OFFICE.

NATHANIEL B. RUNNALS, OF PITTSFIELD, MAINE.

MULTIPLE-SPEED GEARING.

No. 912,418.   Specification of Letters Patent.   Patented Feb. 16, 1909.

Application filed September 17, 1908. Serial No. 453,468.

*To all whom it may concern:*

Be it known that I, NATHANIEL B. RUNNALS, a citizen of the United States, residing at Pittsfield, in the county of Somerset and State of Maine, have invented a new and useful Multiple-Speed Gearing, of which the following is a specification.

This invention has reference to improvements in multiple speed gearing and its object is to provide a means for changing speed which will replace cone pulleys and such structures.

It is customary in transmission gearing where it is desired to change the speed to provide a number of gears of different diameters and shift other gears into mesh therewith one at a time to effect the change of speed.

In accordance with the present invention the gears are always in mesh and provision is made for rendering any one of the gears active, and these gears being differently proportioned will cause a corresponding variation in the speed between the drive and driven members.

The improved speed changing gear structure is designed to be mounted upon a shaft which may be either the drive or the driven shaft, and because there are no shiftable gears, the structure is very compact and will take up but little more if any more room than an ordinary pulley capable of transmitting a like amount of power. Furthermore, the changes from one speed to another speed are made by simply pressing a suitable one or other of a number of push buttons, requiring practically no effort on the part of the operator, while the work of shifting from one speed to another is performed by the device itself.

The invention will be best understood from a consideration of the following detail description taken in connection with the accompanying drawings forming a part of this specification, in which drawings, Figure 1 is a face view of the structure forming the subject matter of the present invention with some parts omitted and others broken away and shown in section. Fig. 2 is a central diametric section of the structure shown in Fig. 1. Fig. 3 is a central sectional elevation on a larger scale than in the other figures of the latch structure.

Referring to the drawings there in shown a shaft 1 which may be considered the power shaft or the driven shaft as the case may be. Mounted upon the shaft 1 is a hub 2 in the form of a collar and this hub is secured to the shaft 1 for rotation therewith by any suitable means as for instance by set screws 3, or if desired by a suitable key, these means of securing the hub to the shaft being considered as equivalent. One end of the hub is reduced in diameter as indicated at 4, thereby forming a shoulder 5. Surrounding the reduced end 4 of the hub and abutting against the shoulder 5 is an annular gear wheel 6 made fast to the hub by screws 7 and a spline 8, the latter being employed to relieve the screws 7 of shearing action when the load is heavy.

Mounted upon the hub 2 on the larger portion thereof and immediately adjacent to the shoulder 5 is a disk 9, which disk is fixed in place in any suitable manner, as for instance, by attachment to some portion of the framework of the machine in which the structure of the invention is used.

Mounted for rotation upon the disk 9 is a cylindrical jacket 10 having at one end an inturned radial flange 11 immediately adjacent to the outer face of the disk 9. The other end of the jacket or casing 10 has applied thereto a web 12 in the form of a disk, at the center of which there is formed a boss or hub 13 through which the shaft 1 extends. The web 12 is made removable from the casing 10 and is secured thereto by screws 14 or otherwise. The web 12 is spaced from the disk 9 by the casing 10 at the periphery and by the reduced portion 4 of the hub 2 at the center, and there is thereby formed an interior chamber 15 within the casing 10 and between the disk 9 and web 12. The web 12 is formed near its periphery and immediately interior to the casing 10 with an annular flange or ledge 16.

In the space between the disk 9 and the ledge 16 there are mounted a number of annular gears 17, 18, 19 and 20, there being four such gears shown in the particular structure illustrated in the drawings, but it is to be understood that a greater or less number of gears may be used as desired. These gears are all of the same external diameter but are of different internal diameters and their inner peripheries are formed with suitable gear teeth.

Mounted upon the inner face of the disk 9, eccentric to the axis of the shaft 1, there is a stud 21, and upon this stud there is journaled a multiple pinion 22 consisting in the particular instance shown in the drawing of a conical series of four pinions integral one with the other or all secured together for common rotation and these pinions are of such size as to mesh with the four internal gears 17, 18, 19 and 20.

Mounted upon the inner face of the disk 9 also eccentric to the axis of the shaft 1 is another stud 23 and this stud carries an idler pinion 24 in mesh with the larger pinion of the group 22 and also in mesh with the annular gear 6 fast to the hub 2.

The idler gear 24 is introduced to make the shaft 1 and gears 17, 18, 19 and 20 rotate in the same sense. If it be desired to cause a reversal of rotation between the shaft and the said internal gears, then the idler gear 24 is omitted and the larger one of the gear sets 22 is made to mesh with the gear wheel 6.

The outer periphery of each internal gear 17, 18, 19 and 20 is formed with a number of inclined notches 25, that is one wall of the notch is inclined and the other wall is abrupt similar to the formation of ratchet teeth. There may be a single notch 25 or a number of such notches around the outer periphery of each internal gear.

The casing 10 carries a latch mechanism for each gear and this latch mechanism is suitably located on the casing to engage the respective internal gears 17, 18, 19 or 20 as the case may be. Since these gears are side by side the latch mechanisms are correspondingly displaced in the direction of the length of the axis of the shaft 1. They are also preferably displaced about the circumference of the casing 10 and in the drawing they are shown as located 90° apart, but it is to be understood that this location is purely arbitrary and may be changed as desired.

Each latch comprises a suitable casing 26 on one end of which is formed a threaded neck 27 by means of which the latch may be screwed into the walls of the casing 10 in line with a radius of said casing 10. Each latch carries a sliding bolt 28 capable of projecting through the neck 27 into the interior of the casing 10, and this bolt is urged in such direction by a spring 29 within the latch casing 26.

Pivoted in a suitable slot 30 in one side of the latch casing 26 is a latch lever 31 having a short arm 32 engaging in a slot 33 in the bolt 28 between the head of the bolt and a pin 34 traversing said slot 33. The other or free end of the latch lever 31 extends beyond the outer end of the latch casing 26 and is there formed into a head 35 although this head may be omitted and the corresponding end of the lever may be made to simply project beyond the outer end of the latch casing 26.

Pivoted to the latch casing 26 on the side opposite that to which the lever 31 is pivoted is another lever 36 and the outer end of this lever extends beyond the outer end of the latch casing 26 but to a less extent than the lever 31. Furthermore the outer end of this lever is displaced laterally with reference to the lever 31 so that its plane of travel is not coincident with that of the lever 31. A spring 37 is housed in the latch casing and urges the lever 36 in a direction to move its lower end toward the bolt 28 and this lower end is formed with a tooth 39 in the path of a notch 40 formed in the corresponding side of the bolt 28.

Fast upon the disk 9 is a bracket 41 and this bracket carries a bar 42 overhanging the casing 10 parallel with the longitudinal axis of the shaft 1. The bar 42 has formed through it a number of passages which are counter-sunk for the greater portion of their length as indicated at 43 and through each passage there extends a pin 44, each pin within the passage carrying a collar or washer 45 fast thereon. Within the counter-bored portions of the perforations the pins 44 are surrounded by helical springs 46 engaging the collars 45 and constantly urging the pins away from the casing 10.

To hold the pins in place the bar 45 is provided with a removable cover 47. The outer ends of the pins may be provided with suitable heads 48 in the form of push buttons or any other suitable form for facilitating the manipulation of the pin and the heads may also carry suitable indications if so desired.

The pins 44 are arranged in operative pairs, one pin of a pair being in the path of the lever 31 where it projects beyond the latch casing 26 and the other being in the path of the lever 36 where it also projects beyond the end of the latch casing 26, and since these two levers are displaced as before described, the pairs of pins belonging to any one latch are correspondingly displaced.

Fast to the casing 10 on the flanged side thereof adjacent to the disk 9 is a ring 49 formed on its outer periphery with sprocket teeth 50, this structure being designed to be engaged by a sprocket chain. It is to be understood however, that the invention is by no means limited to this means of transmitting power since a belt may be used after the manner of the sprocket chain or the ring 49 may be formed with gear teeth or power may be transmitted directly to or from the casing 10 by means of a belt or gear teeth or sprocket teeth as the case may be, the choice of means for transmitting power being within the province of the constructing engineer.

Oil ducts 51 are shown in Fig. 2 and these oil ducts are in communication through the disk 9 with the interior of the casing 10 so that lubricant may be conducted to the several gears as needed.

Let it be assumed that power is applied to the shaft 1 then the hub 2 will participate in any movement imparted to the shaft 1, and since the gear wheel 6 is fast to the hub this gear wheel will also be rotated with the shaft 1. If it be assumed for illustration that the gear wheel 6 is moving clockwise as viewed in Fig. 1, then the idler 24 will move counter-clockwise and the set of pinions 22 will in turn be moved clockwise, and since these gears 22 are in mesh with all the internal gear rings 17, 18, 19 and 20 the latter will also move clockwise or in the same direction as the shaft 1. Under these conditions and before rotative movement is imparted to the casing 10 the latches are assumed to be all in the unlatched position. For this purpose the levers 31 of all the latches are moved so that their upper ends are away from the latch casing 26 and the lower ends thereby elevate the latch bolts 28. When the latch bolt is moved up into the latch casing against the action of the spring 29 the notch 40 is ultimately brought into coincidence with the tooth 39 of the lever 36 and then the action of the spring 37 causes the tooth 39 to enter the notch 40 and so lock the latch bolt against movement into the casing 10 under the action of the spring 29. When the latch bolt is locked in its retracted position then the lever 36 has its upper end moved a short distance away from the latch casing 26. Now let it be assumed that under these conditions the shaft 1 is rotating and the gears 17, 18, 19 and 20 are also rotating in the same direction but with different speeds in accordance with the internal diameters of these gears and the sizes of the respective pinions 22. The shaft 1 being the power shaft under this assumption, the casing 10 is stationary and it is therefore necessary to couple this casing with the desired one 17, 18, 19 or 20 of the annular gears. This may be done in one of two ways. The operator may either move the desired lever 36 of a latch by pressing the same in the proper direction with the finger or he may depress a proper one of the pins 44 so that its end will be in the path of the desired lever 36, and then by partially rotating the casing 10 in the proper direction the depressed pin is made to engage the lever 36 and move the same sufficiently against the action of the spring 44 until the tooth 39 has escaped from the notch 40. Under these conditions the spring 29 is then free to act and the latch bolt 28 is urged toward the interior of the casing 10. As soon as the notch 25 in the outer periphery of the internal gear ring controlled by the particular latch under consideration is reached then the latch bolt 28 will enter such notch until it engages the abrupt shoulder of the notch and so locks the casing to the particular internal gear. Now the casing 10 participates in the movement of the shaft 1 at a speed commensurate with the speed of the particular internal gear coupled to it, while the other internal gears simply rotate idly at their own particular speeds. The engagement of the pins with the outer ends of the levers 36 need be only sufficient to move the same against the action of the springs 37 and then, because of the rounded ends of such levers and if desired of the pins, will readily cause the pins to ride over these levers since the springs 46 will yield easily to permit this movement.

Suppose that the operator desires to cut off the power from the work, then the other one of the pair of pins 44 is depressed against the action of its spring 46 and this pin is brought into the path of the upper end of the lever 31, which lever when the bolt 28 is projected has its outer end beyond the plane of the outer end of the latch casing 26. The pin last referred to will engage the end of the lever 36 when the latter has reached the said pin and the lever will be moved about its pivot thus retracting the bolt 28 from the notch 25 of the particular internal gear with which it was in engagement. When the latch bolt has been retracted it is immediately locked in the retracted position by the engagement of the toothed end of the lever 36 with the notch 40 of said latch bolt. Under these circumstances the power is cut off from the sprocket 49. If, however, the operator desires to change the speed while the structure is in motion, then he manipulates a different one of the pins 44 in the manner already described and so couples the work to the power at the desired different speed, it being understood, of course, that the casing 10 does not cease rotating during the short interval of uncoupling and recoupling.

The springs 46, which are used to return the pins 44 to normal position, may be made very light so that the operator has to exert but a minimum of force to throw the pins into the path of either lever 31 or 36. Whatever power is necessary to operate the latches is furnished entirely by the machine and the push pins may therefore be made to operate as lightly as may be desired.

It is to be observed that the latches and operating means therefor are substantially radial to the axis of the shaft 1 and the axial length of the entire device is substantially that of the thickness of the internal gears and the inclosing casing therefor. The structure is thus very compact and is useful in lathes and in other structures where economy in length is desirable.

Of course when power is applied directly to the casing 10 and the shaft 1 becomes the driven member, the initial manipulation of the lever 36 or of the casing 10 to cause the first coupling of the latter to the shaft 1 is unnecessary.

What is claimed is:—

1. In a speed changing gearing, two terminal movable members, one being the drive member, and the other the driven member, a series of gears, constant connections between the gears and one of the movable members, latches carried by the other movable member and capable of being actuated into and out of operative relation to the gears, and means carried by a fixed portion of the structure for operating the latches at will.

2. In a speed changing gearing two terminal movable members and means for coupling said terminal movable members together, comprising a series of internal gears of different diameters, a series of other gears in constant mesh with the internal gears and connected with one of the movable members, the other movable member housing the gears, latches carried by the last named movable member, and means for operating said latches.

3. In a speed changing gearing, two terminal members, one being the drive member and the other the driven member, a series of internal gears of different diameters, means for connecting any one of the internal gears to a corresponding one of the movable members, a series of other gears in constant mesh with the internal gears and having their journals fixed in space, and another gear connected to the other one of the movable members and in turn connected to the second named gears.

4. In a speed changing gearing, a terminal movable member, a series of internal gears of different diameters, a series of other gears in constant mesh with the internal gears and having their journals fixed in space, and another gear connected to the terminal movable member and in turn connected to the second named gears, another terminal movable member housing the gears, latches carried by the last named terminal member, and means for operating said latches.

5. In a speed changing gearing, a terminal movable member, a series of internal gears of different internal diameters, a series of other gears in fixed relation one to the other and all in mesh with respective ones of the internal gears, said second named gears being connected to the said terminal movable member, another terminal movable member, and means for coupling any of the internal gears to the last named terminal member.

6. In a speed changing gearing, a terminal movable member, a series of internal gears of different internal diameters, a series of other gears in fixed relation one to the other and all in mesh with respective ones of the internal gears, said second named gears being connected to the said terminal movable member, another terminal movable member housing all the gears, and means for coupling any of the internal gears to the last named terminal member.

7. In a speed changing gearing, a terminal movable member, a series of internal gears of different internal diameters, a series of other gears in fixed relation to the other and all in mesh with respective ones of the internal gears, said second named gears being connected to the said terminal movable member, another terminal movable member, and means for coupling any of the internal gears to the last named terminal movable member comprising a latch member capable of actuation to either the latched or the unlatched position and different actuating members for each latch member.

8. In a speed changing gear, a terminal movable member, a member thereon held against movement, a rotatable casing on the fixed member, means on said casing for transmitting power, a series of internal gears of different diameters in the casing, other gears of different diameters in the said casing and carried by the fixed member, said second named gears meshing with the internal gears and operatively connected to the said terminal movable member, and means for coupling the casing to any of the internal gears at will.

9. In a speed changing gear, a terminal movable member, a member thereon held against movement, a rotatable casing on the fixed member, means on said casing for transmitting power, a series of internal gears of different diameters in the casing, other gears of different diameters in said casing and carried by the fixed member, said second named gears meshing with the internal gears and operatively connected to the said terminal movable member, and means carried peripherally by the casing for coupling it to any of the internal gears at will.

10. In a speed changing gear, a terminal movable member, a member thereon held against movement, a rotatable casing on the fixed member, means on said casing for transmitting power, a series of internal gears of different diameters in the casing, other gears of different diameters in said casing and carried by the fixed member, said second named gears meshing with the internal gears and operatively connected to the said terminal movable member, and means carried peripherally by the casing for coupling it to any of the internal gears, and means carried by the fixed member for causing the operation of the coupling means at will.

11. In a speed changing gear, a terminal movable member, a member thereon held against movement, a rotatable casing on the fixed member, means on said casing for transmitting power, a series of internal gears of different diameters in the casing, other gears of different diameters in said casing and carried by the fixed member, said second named gears meshing with the internal gears and operatively connected to the said terminal movable member, latches carried peripherally by the casing for coupling it to any of the internal gears, means carried by the fixed member for causing the operation of the latches to couple the casing to any of the internal gears, and means also carried by the fixed member for operating the latches to uncouple the casing from the gears.

12. In a speed changing gear, a shaft, a disk thereon held against movement, a rotatable casing on the disk, means on said casing for transmitting power, a series of internal gears of different diameters mounted for rotation in the casing, other gears of different diameters in said casing and carried by the fixed disk, said second named gears meshing with the internal gears and operatively connected to the shaft, and means for coupling the casing to any of the internal gears at will.

13. In a speed changing gear, a shaft, a disk thereon held against movement, a rotatable casing on the disk, means on said casing for transmitting power, a series of internal gears of different diameters mounted for rotation in the casing, other gears of different diameters in said casing and carried by the fixed disk, said second named gears meshing with the internal gears, and operatively connected to the shaft, latches carried peripherally by the casing for coupling it to any of the internal gears, movable stops carried by the disk for causing the operation of the latches to couple the casing to any of the internal gears, and other movable stops also carried by the disk for operating the latches to uncouple the casing from the gears.

14. In a speed changing gear, a drive member, a driven member, and latches for coupling the drive and driven members comprising a latch bolt normally constrained to move in one direction, a lever for moving it in the opposite direction, a catch for locking the latch bolt in the inactive position, means for causing the movement of the lever to actuate the latch bolt against the constraining means, and means for causing the operation of the catch to release the latch bolt.

15. In a speed changing gear, a drive member, a driven member, and latches carried by one of the members for coupling the drive and driven members, each latch comprising a latch bolt, a spring for moving the latch bolt to active position, a lever for moving the latch bolt to inoperative position, a catch for locking the latch bolt in the inactive position, and means carried by a fixed part of the structure and movable into the path of the latches to operate the latter.

16. In a speed changing gear, a drive member, a driven member, and latches carried by one of the members for coupling the drive and driven members, each latch comprising a latch bolt, a spring for moving the latch bolt to active position, a lever for moving the latch bolt to inactive position, a catch for locking the latch bolt in the inactive position, means carried by a fixed part of the structure and movable into the path of the latches to cause the operation of the latter to active position and other means carried by a fixed part of the structure and movable into the path of the latches to cause the operation of the latter to inactive position.

17. In a speed changing gear, a drive member, a driven member, and latches carried by one of the members for coupling the drive and driven members, each latch comprising a latch bolt, a spring for moving the latch bolt into active position, a lever for moving the latch bolt to inactive position, a catch for locking the latch bolt in the inactive position, stops carried by a fixed part of the structure and movable into the path of the latch bolt levers to cause the operation of the latches to active position, and other stops carried by a fixed part of the structure and movable into the path of the catches for causing the operation of the latches into inactive position.

18. In a speed changing gear, a drive member, a driven member, and latches carried by one of the members for coupling the drive and driven members, each latch comprising a latch bolt, a spring for moving the latch bolt to active position, a lever for moving the latch bolt to inactive position, a catch for locking the latch bolt in the inactive position, spring constrained stops carried by a fixed part of the structure and movable into the path of the latch bolt levers to cause the operation of the latches to inactive position, and other spring constrained stops carried by a fixed part of the structure and movable into the path of the catches to cause the operation of the latches to active position.

In testimony that I claim the foregoing as my own, I have hereto affixed my signature in the presence of two witnesses.

NATHANIEL B. RUNNALS.

Witnesses:
GEORGE P. HOOPER,
HARRY H. THURLOUGH.